May 17, 1949.    R. G. PIETY    2,470,412
ALTERNATING CURRENT IMPEDANCE METER
Filed Dec. 7, 1943    3 Sheets-Sheet 1

INVENTOR
R.G. PIETY
BY Hudson Young & Yinger
ATTORNEYS

May 17, 1949.                R. G. PIETY                2,470,412
                ALTERNATING CURRENT IMPEDANCE METER
Filed Dec. 7, 1943                              3 Sheets-Sheet 2

INVENTOR
R. G. PIETY
BY Hudson Young & Yinger
ATTORNEYS

Patented May 17, 1949

2,470,412

UNITED STATES PATENT OFFICE 2,470,412

ALTERNATING CURRENT IMPEDANCE METER

Raymond G. Piety, Bartlesville, Okla., assignor to Phillips Petroleum Company, a corporation of Delaware Application December 7, 1943, Serial No. 513,312

13 Claims. (Cl. 175—183)

This invention relates to the measurement of electrical impedances, and it has particular relation to the measurement of the resistive component and the reactive component of any alternating current impedance by direct and instantaneous methods and means. It has further particular relation to said type of measurement of driving point impedances or transfer impedances in any type of network from a one mesh network on up to a network having an infinite number of meshes, such as the earth between two or more grounded points.

Difficulties arise in measuring impedances by the methods of the prior art which involve the use of a bridge circuit in which the ratio of the resistances to direct current of a known impedance Z, in a first leg and an unknown impedance $Z_2$ in a second leg to known and variable resistances $R_3$ and $R_4$ in a third and fourth leg respectively are first balanced by varying these variable resistances to a direct current in the third and fourth legs of the bridge until the ratio of resistances is:

$$\frac{Z_1}{R_3} = \frac{Z_2}{R_4}$$

Then the reactive value of the known impedance to an alternating current is varied to balance out the reactive value of the unknown impedance to said alternating current. Obviously, this takes considerable time, intelligence, and time consuming reading of dials and plugs and mathematical calculations of the exact ratios involved. If the alternating current is of a very low frequency (as necessary in earth impedance measurements) special care, elaborate standards and special null detecting devices will be required in this bridge method. Varying impedances, where either or both of the reactive and resistive components are varying from moment to moment cannot be measured at all because of the time required to reach a resistive balance and hold it while the impedance balance is made. In the routine measuring of the impedances of a large number of simple commercial coils considerable time is spent, because the resistive balance as well as the inductive balance has to be made over again for each coil tested, and then the ratios for each coil must be calculated. The non-reactive variable and fixed resistances, the variable impedance that varies its reactive but not its resistive component, the special current sources, all make the impedance bridge an expensive and bulky device which is slow in performance and cannot measure impedances by direct or instantaneous means.

Difficulties are experienced in measuring impedances as small as 0.001 ohm which is often necessary in geophysical prospecting. Impedances of this size are difficult to measure rapidly with any usual method. These measurements often must be made with an alternating current of 0.1 to 1 cycle per second, as higher frequency currents do not penetrate the earth to the depth required. The transfer impedance between two pairs of earthed electrodes spaced several thousand feet apart has a considerable reactive component even for frequencies below 10 cycles per second. To measure this component the usual procedure is to compare the voltage of an alternating current potentiometer, a procedure requiring a time consuming balancing operation of a delicate nature.

One object of my invention is to provide methods and means for measuring alternating current impedances with substantially the same ease with which resistances are measured with a direct current ohmmeter.

Another object is to provide methods and means in which the resistive and reactive components are read directly and instantaneously from the deflection of separate meters, or alternatively from the deflection of the same meter, and to do away with any dial boxes which must be adjusted by the operator.

Another object is to provide methods and means capable of rapid measurement of impedances where speed of measurement is important, as in the commercial measurement of thousands of coils, or where the amount and quality of the impedance is varying during the time required for measurement, as in dealing with impedances of the earth or other variable impedances.

Another object is to provide methods of and means for measuring impedance in which the meter calibration is substantially independent of the frequency over the entire audio range.

Another object is to provide methods of and means for measuring impedances that will operate at very low frequencies, such as 0.1 to 1 cycle per second, frequencies found necessary in geophysical work, as higher frequencies do not permit the current to penetrate deep enough in the earth, and direct currents cause polarization and do not distinguish from natural currents in the earth, or natural polarization potentials.

Another object is to provide methods and means capable of measuring transfer impedances of as small values as 0.001 ohm such as must be measured in geophysical explorations, with the additional object of obtaining the value of the reactive component by a direct reading and without time consuming balancing operations of a delicate nature.

Another object is to provide methods and means whereby the relative component, or the reactive component of a driving point, or a transfer impedance will be measured and will be indicated by the direct reading of a meter.

Further objects are to provide a simplified, relatively inexpensive impedance meter having few adjustments; to provide apparatus which can be used effectively with minimum chance for errors by personnel not very highly skilled and with an error of at least less than 1%, and to provide apparatus useful in geophysical surveying.

Numerous other objects and advantages will be apparent to those skilled in the art upon reading the following specification and claims and studying the drawings.

Figure 1:
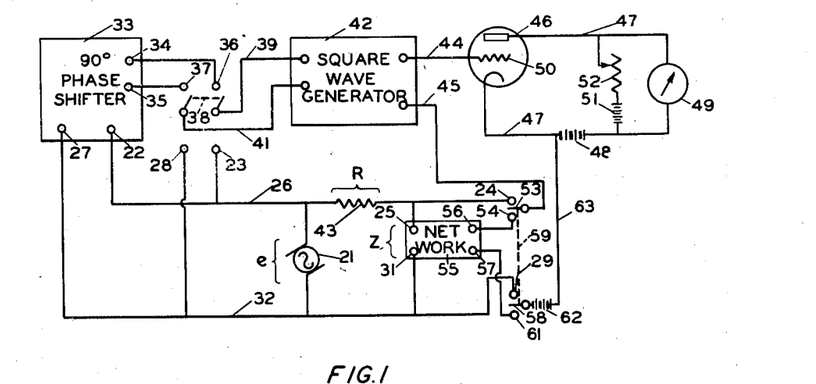
Figure 1 is a diagrammatic plan view of a simple embodiment of the invention using one meter to measure either the resistive or reactive component of the impedance.

As shown in Figure 1 an alternating current generator 21 generates a current having a sinusoidal voltage and current value with respect to time One pole of generator 21 is connected to terminals 22, 23, 24 and 25 by wire 26, while the other pole is connected to terminals 27, 28, 29 and 31 by wire 32.

Current from terminals 22 and 27 is led through a 90° phase shifter 33, which may consist of a pentode tube (not shown) with a substantially purely reactive plate load, the voltage developed across the load being substantially 90° out of phase with the grid voltage. Or the phase shifter may be merely a transformer coupled vacuum tube amplifier where the primary and mutual inductances are small compared to plate resistance of the coupling tube. Many forms of phase shifters are old in the electronic and radio arts and it will be obvious to the usual electrical engineer that many of these may be employed with useful results in place of the particular example of the pentode tube and its reactive plate load given above.

The current emerging from terminals 34 and 35 of the phase shifter 33 is therefore in quadrature (that is 90° out of phase) with the current generated by generator 21. Terminals 34 and 35 are directly connected to terminals 36 and 37 respectively.

A double-pole-double-throw switch 38 connects terminals 37 and 36, or terminals 28 and 23, to wires 39 and 41 respectively to feed the sinusoidal current with or without the 90° phase shift into a square wave generator 42.

The square wave generator 42 may consist of two stages of overloaded amplification, or a one stage amplifier with a duo-diode clipping circuit. It is also convenient to use a greatly overloaded direct-coupled push-pull amplifier with considerable degeneration, or else to use a multivibrator to generate the square waves. Square waves may be produced by any of the many well known means such as circuits which square any periodic waves and yet be successfully used in my invention.

A relatively high resistance 43 is provided as part of the circuit 26 from generator 21 to the terminals 24 and 25. This resistance 43 has a value much greater in the preferred modification (and much less in the alternative modification) than the absolute value of the impedance to be measured for purposes to be explained later.

The output of the square wave generator is impressed on wires 44 and 45 which are in the grid cathode circuit of a triode 46. The plate-cathode circuit 47 of the triode 46 contains a B battery 48 and a meter 49. Wire 44 leads directly to the grid 50.

The meter 49 is any ordinary direct current meter with sufficient damping so its deflection will be the average value of the pulsating plate current passing through it. Shunted across meter 49 is a balancing-out or bucking battery 51 and variable resistance 52 for purposes to be explained later.

The grid-cathode circuit of tube 46 includes the square wave generator 42, the wire 45 and a switch 53 which can be connected to terminals 24 or 54. The relative positions of parts 46, 42, 58 and 62 is immaterial as long as they are in series.

Terminal 24 leads to terminal 25 of any network 55 and terminal 54 leads to terminal 56 of the network 55. Network 55 has terminals 25, 31, 56 and 57 which may be connected in any way to each other. There may be any number of meshes in the network and in fact terminals 25, 56, 31 and 57 can just be spaced electrodes buried into the earth, the earth itself being the network 55. Or network 55 can be as simple as a single element connecting all four terminals or as complicated a meshwork of resistances, inductances and capacities as can be imagined.

A similar switch 58 is ganged to switch 53 by a bar 59 so that when switch 53 is on terminal 24 or 54 switch 58 is on terminal 29 or 61 respectively. The grid-cathode circuit thus passes through the network 55 from terminal 25 to 31, or from 56 to 57 depending on the position of switches 53 and 58.

From switch 58 the grid-cathode circuit passes through C battery 62 and wires 63 and 47 to the cathode of tube 46.

Figure 2:
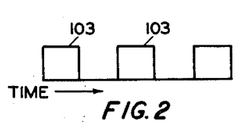
Figures 2 to 6 inclusive are graphs of currents flowing in the meter in Figure 1 with time as the abscissas and current voltages as the ordinates.

Figures 2 to 7 show the shape of the waves of the voltage impressed on the grid 50 of tube 46 and will be discussed in describing the operation of the device of Figure 1 below. Figure 2 shows the wave form of the output of square wave generator 42. Figures 3 to 6, inclusive, show the resultant voltage produced by addition of half waves of sinusoidal form to the square waves, the positive half waves being in phase with the square waves in Figure 3, lagging a few degrees behind the square waves in Figure 4, leading the square waves by 90 degrees in Figure 5, and leading the square waves by 180 degrees in Figure 6.

Figures 8, 9, 10, 11, 12, 13:
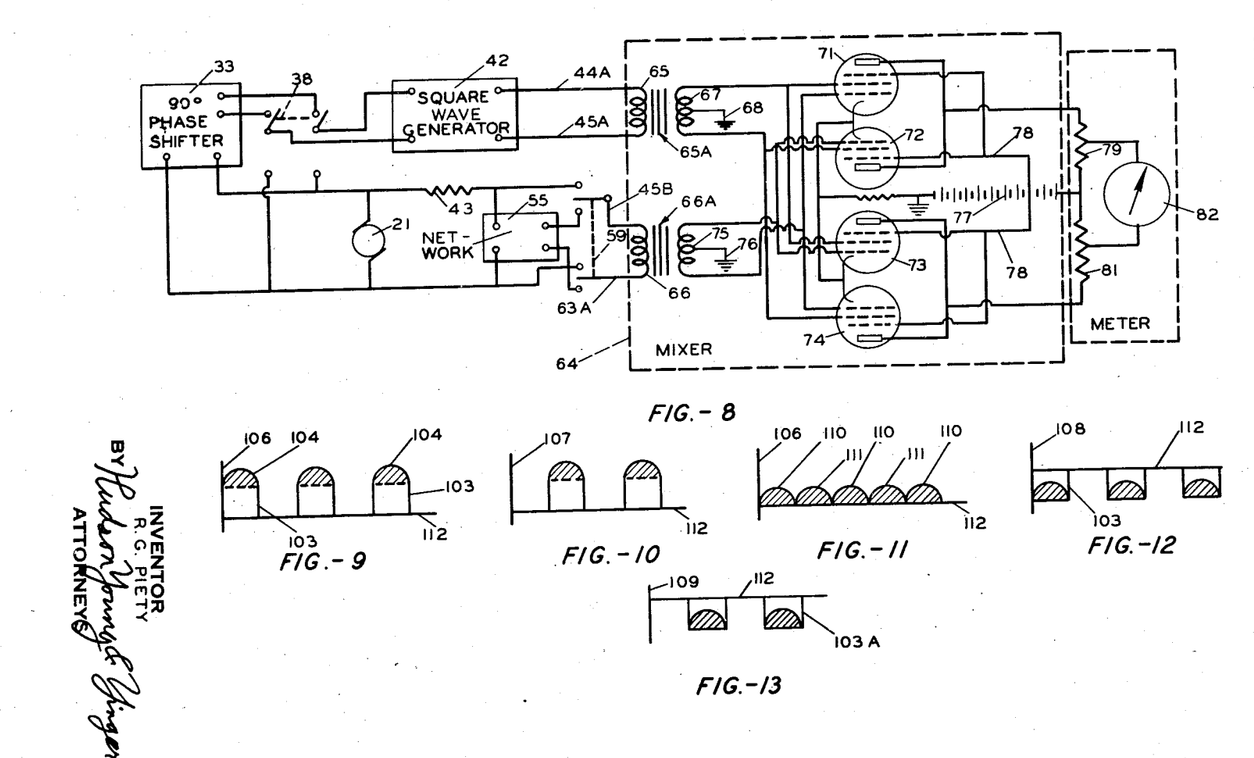
Figure 8 is a diagrammatic plan view of a modified form of the invention in which the push-pull principle is applied to the apparatus of Figure 1.
Figures 9 to 13 are graphs of currents in Figure 8 similar to the graphs of Figures 2 to 6.

Figure 8 shows how the push-pull principle can be applied to my invention. The simple circuit of Figure 1 needs certain modifications to adapt it to very low frequencies and small impedances. When the frequency is very low, say one cycle per second, it is difficult to obtain rapid reading because the meter 49 must have a very slow movement in order to average the relatively slowly pulsating plate current of tube 46. This difficulty can be reduced by using push-pull triodes (or other push-pull tubes) in place of the single triode 46. This will double the pulsation frequency through the meter 49.

In order to increase the linearity of the meter deflection, I prefer to use a double-balanced push-pull circuit 64 in Figure 8 in place of the triode 46.

The circuit 64 is enclosed in dotted lines and designated a mixer in Figure 8 because it mixes the signals from the square wave generator and the network.

The apparatus in Figure 8 from the left side and as far right as wires 44A, 45A, 45B and 63A is the same as in Figure 1 so only a few reference characters are applied. Note that wire 45 has been split and now is 45A and 45B. Wire 45 is joined to 44A through a primary winding 65, of a transformer 65A and wire 45B is joined to wire 63A through a primary winding of a second transformer 66A.

The transformer 65A is provided with a center tapped secondary winding 67, the center tap of which is grounded. Other obvious forms of coupling between 65 and 67 could be used however. The opposite ends of coil 67 are connected to any control grid (although the center grids are shown) of tubes 71, 72, 73 and 74, which may be of the type used for mixing two signals in a superheterodyne radio receiver.

The coil 66 is similarly coupled to coil 75, similarly grounded at 76 and leads to any control grid (although the grid near the cathode is shown) of tubes 71, 72, 73, and 74.

A "B" battery 77 is connected in the cathode plate circuit of tubes 71, 72, 73 and 74, and at an intermediate plate of the battery two leads are taken off leading to a screen grid in each tube. The voltage developed across resistances 79 and 81 are impressed on meter 82.

A dotted line has been drawn around meter 82 and resistances 79 and 81, and this area is designated as "Meter." However, the line of division may be placed elsewhere, and all parts of the device cooperate to move the hand of meter 82. Meter 82 is the same type as meter 49 described above.

Figures 9 to 13 show the shape of waves of the voltage impressed on meter 82 and will be discussed in describing the operation of Figure 8 below. Figures 9, 10, 12, and 13 represent the wave form in the anode circuits of tubes 73, 74, 71, and 72, respectively, while Figure 11 shows the combined voltage impressed on the meter from the four anode circuits.

Figure 14:
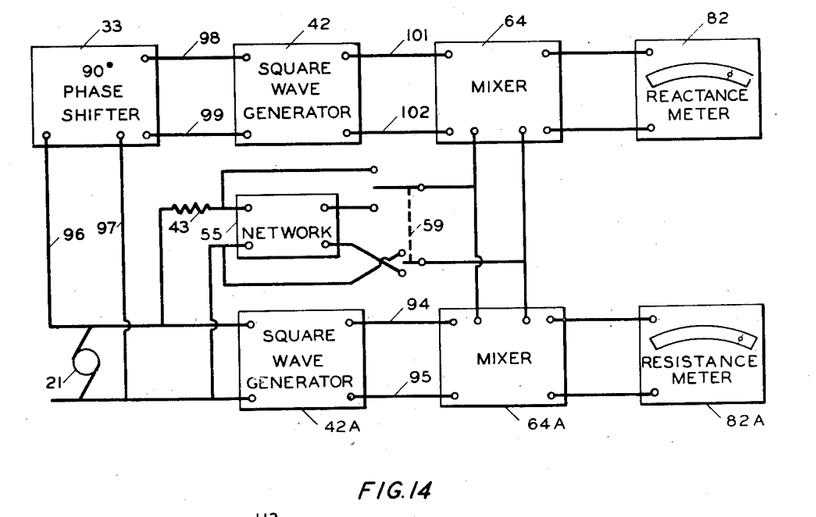
Figure 14 is a diagrammatic plan view of a modified form of the invention in which apparatus similar to that of Figure 8 is designed to operate two meters simultaneously.

Figure 14 shows a further modification of the apparatus shown in Figure 8. It often is an advantage to read both the reactive and the resistive components at once, especially if they are changing. Figure 14 shows suitable means of doing so.

Figure 14 differs from Figure 8 in that reversing switch 38 is removed and a square wave generator 42A is supplied with waves in phase with sinusoidal wave generator 21 and a square wave generator 42 is supplied through phase shifter 33 with a voltage in quadrature with the voltage of the generator 21. The voltages in or across network 55 are mixed with the shifted and unshifted square waves respectively in mixers 64 and 64A in the same manner as in Figure 8, and meters 82 and 82A are the same as 82 in Figure 8.

While two square wave generators are shown in Figure 14, it is obvious that by a non-inventive change of circuits, including, of course, the usual and proper coupling between the elements, that the phase shifter 33 could take its input from wires 94 and 95 instead of wires 96 and 97, in which case square wave generator 42A would suffice and generator 42 could be eliminated and wires 98 and 99 be connected to wires 101 and 102 respectively.

Figure 15:
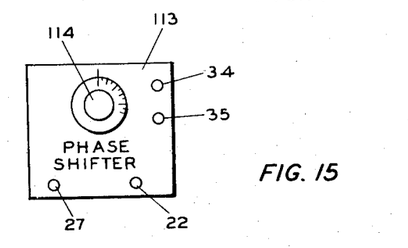
Figure 15 shows a calibrated variable phase shifter which may be employed in place of the 90° phase shifter of the other figures.

In Figure 15, box 113 contains a variable phase shifter to be connected at 22, 27, 34 and 35 just like shifter 33. Dial 114 acts as a knob to turn to change the phase and also to read the phase angle.

Operation:

The operation of Figure 1 is as follows:
Let switches 53 and 58 be in their upper position contacting terminals 24 and 29 respectively. Let switch 38 be down.

Consider the series circuit of sinusoidal alternating current generator 21, resistance 43 and the impedance Z between terminals 25 and 31.

Let $e$ be the voltage in volts generated by 21, let I be the current in this circuit in amperes and R be the resistance of 43 in ohms. Then the current in the circuit is:

$$I = \frac{e}{R+Z}$$

But R is made so large compared to Z, which may be 1,000 times smaller, that the term Z may be disregarded and $$I = \frac{e}{R}$$

Then the voltage drop E across impedance Z is:

$$E = \frac{eZ}{R}$$

But $e/R$ can be held constant so that E is proportional to Z.

For the the measurement of the resistive component of the impedance Z the sinusoidal current of generator 21 is transmitted through terminals 28, 23, switch 38 and wires 39 and 41 to the square wave generator 42 where it is made into the square voltage pulses 103 of the shape shown in Figure 2 which will always automatically be in phase with the positive or else the negative portions of the current of sinusoidal generator 21. These square pulses of voltage are impressed on the grid of the triode 46. C battery 62 gives grid 50 sufficient bias to keep the plate current of tube 46 at substantially zero during the time interval between positive pulses of the square wave generator even when voltage E is on the grid.

The square pulse voltage is also enough to overcome said grid bias by a voltage P greater than $E_m$ (the maximum ± value of E from the level of P), and the square wave generator 42 is adjusted so that it swings sufficiently positive to bias the tube 46 so that $P \pm E$ will always lie on the most linear portion of the grid voltage plate current curve of tube 46.

This voltage is being impressed on meter 49, and the meter has a time constant such that its deflection will be the average voltage. Any electrical engineer skilled in the art can easily design suitable meters for this use. The meter can now be set to a middle reading of zero for these square waves by adjusting rheostat 52 to adjust the bucking voltage of battery 51. Only changes from the areas of Figures 2 will then be measured.

Figure 3:
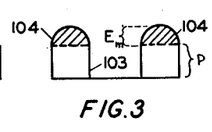

In Figure 3 the positive half wave 104 of the sinusoidal voltage E is in phase with the square waves. This indicates that Z is in fact pure resistance, because there has been no phase shift of the voltage E developed across Z due to any reactive component in Z. The value of the resistance will be read on meter 49, as the shaded "humps" 104 of the waves in Figure 3 are an added voltage E over a period of time which can be averaged by meter 49 as an addition to the average voltage of Figure 2 which has been balanced out.

Figure 6:
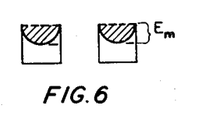

In Figure 6, the negative half wave of the sinusoidal voltage E is in phase with the square wave. The fact that they are in phase again indicates Z is a pure resistance. The value of E is merely subtracted from the area of the square wave, instead of being added as in Figure 3, and the meter hand deflects the same distance in the other direction from the central zero. The resistance indicated is negative which is possible in a four terminal network.

Now if Z is partly reactive, the voltage E is going to be shifted in phase with respect to the voltage $e$. If Z has inductive reactance, the hump 104 will shift to the left because in an inductance circuit, the voltage always leads the current flowing through said circuit. If Z has capacitative reactance the peak of hump 104 will shift to the right as capacitative reactance has the opposite effect.

Figure 4:
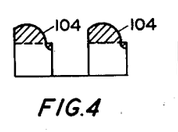
Figure 5:
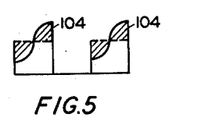
Figure 7:
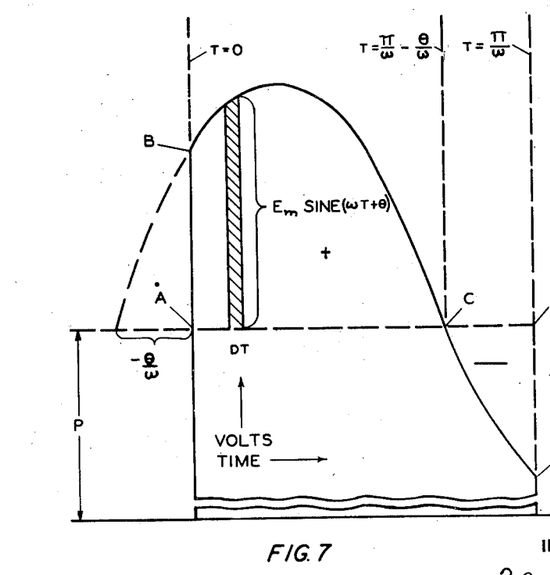
Figure 7 is an enlarged graph of a portion of Figure 4 with limits indicated thereon.

In Figure 4, inductive reactance has shifted E to the left. Figure 7 is an enlarged view of a portion of Figure 4. In Figure 5, capacitative reactance has shifted the peak of hump E to the right as far as possible, that is a phase shift of 90° or $$\theta = \frac{\pi}{2} \text{ and time } t = \frac{\pi}{2\omega}$$

As usual $\omega = 2\pi$ times the frequency of the alternating current used.

In short, in Figure 3 is shown the wave form obtained when Z is a pure resistance; in Figure 4 the wave form obtained when Z is an impedance which has both resistive and reactive components on the square wave; and in Figure 5 the wave form obtained when Z is a pure capacitance. The area of the square wave plus the sine wave varies, being greater than the square wave in Figures 3 and 4, but equal to the square wave in Figure 5 where the shaded area above the line equals that below the line. The added area over that of the square wave is due to the resistive component.

When the switch 38 is up, and the phase shifts 90°, then the effects of Figures 3 and 5 exchange, and the added areas are now due to the reactive components, which for pure resistance is now zero in Figure 5.

Moving switch 38 down again, attention is directed to Figure 7 in which the resistive component of impedance Z is being measured.

The meter 49 is an averaging meter and the deflection therefore averages the areas in Figures 2 to 7. If A is positive area, $t$ is time and K is a combined proportionality constant of tube 46, the tube circuit and meter 49, then the deflection D of the meter is:

$$D = \frac{K \Delta A}{\Delta t}$$

Applying this formula to Figure 7, area ABCA is positive and area CFDC is negative and we obtain:

$$D = \frac{kP}{2} \pm \frac{k\omega}{2\pi} \int_0^{\frac{\pi}{\omega}} E_m \sin(\omega t + \theta) dt$$

Now $$\frac{kP}{2}$$

is balanced out by rheostat 52, and while the other term is ± depending on whether the square waves are in phase with the generator 21 (as in Figures 3 to 5 and 7) or 180° out of phase (as in Figure 6) the absolute value being the same and the meter hand of 49 merely deflecting from the central zero in the other direction. So therefore:

$$D = \frac{\omega k E_m}{2\pi} \left[ \int_0^{\frac{\pi}{\omega}} \sin \omega t \cos \theta \, dt + \int_0^{\frac{\pi}{\omega}} \cos \omega t \sin \theta \, dt \right]$$

$$D = \frac{\omega k E_m}{2\pi} \left[ \cos \theta \left[ -\frac{1}{\omega} \cos \omega t \right]_0^{\frac{\pi}{\omega}} + \sin \theta \left[ \frac{1}{\omega} \sin \omega t \right]_0^{\frac{\pi}{\omega}} \right]$$

$$D = \frac{\omega k E_m}{2\pi} \left[ \frac{2 \cos \theta}{\omega} \right] = \frac{K E_m \cos \theta}{\pi}$$

Or choosing another constant $$h = \frac{K e}{\pi R}$$

and remembering the equation $$E = \frac{eZ}{R}$$

set forth above, we find that:

$$D = hZ \cos \theta$$

Therefore D is proportional to $Z \cos \theta$ which is by definition, the resistive component of impedance Z.

Now if switch 38 is thrown up in Figure 1, then phase shifter 33 makes BCD in Figure 7 change from $E_m \sin(\omega t + \theta)$ to $\pm E_m \cos(\omega t + \theta)$. By similar equations to those above the deflection now becomes proportional to $Z \sin \theta$ which is the reactive component of impedance Z.

Suppose the apparatus of Figure 1 is turned on with switch 38 up to measure reactance. With a pure resistance between 25 and 31 the wave form of the type of Figure 5 is obtained and rheostat 52 is adjusted to zero the meter. Capacitative reactance will move the curve 104 in one direction and inductive reactance will move curve 104 in the opposite direction, and obviously one of these movements will increase the area and the other decrease it. For example, in Figure 5, if 104 moves to the left, the area increases and to the right, it decreases. The maximum shift possible is of course 90° as it approaches Figures 3 or 6 as limits. Now by putting a condenser between 25 and 31 the direction of movement for capacity is seen, and later when Z of network 55 is measured the direction of the deflection of the hand of meter 49 will indicate whether the reactance is capacitative or inductive reactance, and the numerical value thereof is shown by the amount of deflection.

If switch 59 in Figures 1, 8 and 14 is thrown down to connect to terminals 54 and 61 the impedance being measured is the transfer impedance, that is E is now developed across terminals 56 and 57 due to reactions taking place in network 55 which may be any network as discussed above. The ratio of the output voltage E to the input current $e/r$ is defined as the transfer impedance Zt.

In Figures 1, 8 and 14 it is obvious that if Z and R are interchanged and R made very small compared to Z then if generator 21 has a very small impedance and switch 59 is in its upper position then the meter deflection will be proportional to the reciprocal of what it was above. Instead of resistance R, conductance 1/R is measured. Instead of reactance X, susceptance 1/X is measured. In this case, the current in the circuit 21, 55, 43 is:

$$I = \frac{e}{R+Z}$$

but Z is made so large compared to R, which may be one thousand times smaller, that the term R may be disregarded and:

$$I = \frac{e}{Z}$$

then the voltage drop E across the resistance R is:

$$E = \frac{eR}{Z}$$

but $eR$ is constant so that E is proportional to $$\frac{I}{Z}$$

It is generally possible however to merely calibrate the meters of Figures 1, 8 and 14 to read reciprocals instead of switching the position and ohmic value of Z and R. Many meters have double scales that a single pointer may point to, and one scale can be calibrated in one set of values and a second scale directly below the first scale can be calibrated in another set of values, so that meters 49, 82 and 82A may be provided with direct values on one scale, and with reciprocal values on the scale below it, and the appropriate scale is read from the hand of the meter depending on the electrical circuit being employed at that time.

The operation of Figure 8 is substantially the same as Figure 1. The pulsation frequency is doubled over Figure 1 by push-pull action. The square wave input 67 and the input 75 from the impedance being measured are balanced to ground 68, 76. The separate input grids in tubes 71, 72, 73 and 74 connected respectively to 67 and 75 provide a convenient means for separating the square wave and the sine wave inputs so that only a very small and negligible amount of coupling exists between them.

The coil 67 is connected at its top to a grid in each of tubes 71 and 73 and at its bottom to a grid in each of tubes 72 and 74. When the top of coil 67 is made negative by the square wave generator 42, tubes 71 and 73 have their plate cathode current cut off completely while tubes 72 and 74 conduct a plate cathode current of a certain steady value. When the top of coil 67 is made positive tubes 72 and 74 are cut off and tubes 71 and 73 conduct a steady plate cathode current.

The coil 75 is connected at its top to a grid in each of tubes 72 and 73 and at its bottom to a grid in each of tubes 71 and 74. When the top of coil 75 is positive it further increases the plate cathode current mentioned in the paragraph above in the particular tube of tubes 72 and 73 that is conducting at that time, in an amount proportional to the strength of the sine wave voltage received from network 55. The tubes that are cut off at that time by the superior voltage of the coil 67 remain cut off. In tubes 71 and 74 the steady plate cathode current is decreased in whichever tube is conducting, and remains cut off in the non-conducting tube. A reversal of polarity in coil 75 tends to increase the plate cathode current in tubes 71 and 74 and reduce it in tubes 72 and 73 subject to cut off from coil 67 as mentioned above.

As the top of resistance 79 leads to the opposite end of meter 82 than the bottom of resistance 81 does, the wave forms relative to the meter differ for each tube, calling the top of the meter positive and the bottom negative as a convenient convention.

At a moment 108 if the bottom of 65 is positive, the top of 67 is made positive and tubes 71 and 73 conduct the square wave. Tube 71 conducting makes the top of 79 negative so Figure 12 is the wave form of the current from this tube relative to the meter employing the convention that current flowing into the top of the meter is positive. If the top of 75 is positive the current in 71 is decreased then the top of 79 becomes a little less negative relative to the meter which cuts off the shaded portion of Figure 12. Similarly, Figure 9, is the wave form of the current to the meter due to the plate current change of tube 73, Figure 13 that of tube 72, and Figure 10 that of tube 74. Line 106 in Figure 9, 107 in Figure 10, 108 in Figure 12 and 109 in Figure 13 represent the same moment in time, while base line 112 is also the same in all Figures 9 to 13, Figures 9 and 10 having wave forms positive to the meter and Figures 12 and 13 wave forms negative to the meter according to the convention.

Adding wave forms of Figures 9, 10, 12 and 13 together a wave form similar to Figure 11 is obtained. Portions 110 come from Figures 9 and 12 while portions 111 come from Figures 10 and 13. The wave form of Figure 11 corresponds to that of Figure 3 for the single tube, and the shaded portions of Figure 11 shift into the shapes of the shaded portions of Figures 4 and 5 as the components of the impedance vary. Voltage of this wave form has the same effect on meter 82 as it had on meter 49. The mathematics will not be repeated but is substantially the same except that there are twice as many pulses which take up the entire time.

By throwing switch 38, the deflection meter 82 may be made proportional to $Z \cos \theta$ which is the resistive component, or to $Z \sin \theta$ which is the reactive component. Thus Figure 8 operates the same as Figure 1 but merely has push-pull operation of the tubes, two sets of two tubes being used to increase the linearity of deflection of the hand of meter 82 and to increase the stability of operation.

The operation of Figure 14 is substantially the same as that of Figure 8 so far as meters 82 and 82A are concerned, as each meter operates to give the reactive or the resistive component respectively all the time, whereas in Figure 8 switch 38 changed the component being measured by a single meter 82.

So far as meters 82 and 82A are concerned, it does not matter whether square wave generators 42 and 42A are 90° or 270° out of phase, as each meter circuit is independent. I then can calculate the impedance mathematically, or I can find the value of the impedance from the reactive and resistive components by means of a graph of the values of the three, such graphical charts being well known in the art.

To measure impedance it is necessary to square the reactive component X and the resistive component R and take the square root of the sum of the squares as:

$$Z = \sqrt{R^2 + X^2}$$

When the circuit of Figure 14 is employed and square wave generators are used which will lock in phase or 180° out of phase with their branch of the circuit, and therefore at 90° or 270° to each other, then tests should be made with a known impedance such as one having inductance and resistance in place of impedance Z between terminals 25 and 31. These tests will reveal in which direction meter 82 will deflect relative to meter 82A for a certain type impedance, such as one having capacitative reactance or inductive reactance.

In the appropriate claims when reference is made to impedance it is intended that these claims shall cover apparatus in which either the driving point impedance or the transfer impedance can be measured.

When a single square wave generator 42A is used, by connecting phase shifter 33 to wires 94 and 95 instead of 96 and 97 and by connecting wires 98 to 101 and 99 to 102 and removing 42 completely; or when square wave generators 42 and 42a are of a type that will always bear the same definite phase relation to voltage e, then the direction of deflection will be known and tests to determine the phase relationships may be eliminated. Waves of the nature of those in Figures 6, 12 and 13 will not occur if the square wave generator or generators always lock in synchronism with the positive portion of the sinusoidal voltage wave to produce waves shaped like those in Figures 3, 4, 5, 7, 9, 10 and 11.

When very small voltages are being measured it becomes necessary to amplify the voltage drop across Z (terminals 25 to 31 in Figure 1 as an example) before impressing it on the grid of the tube (such as tube 46 in Figure 1). Obviously any phase shifts in the amplifier should be taken into account in the calibration of the meter.

In the event that the network the impedance of which is being measured does not contain a direct current path between terminals 56 and 57 (in Figure 1 for example) then a shunt resistance or grid leak is necessary between 56 and 57 to obtain bias on the grid 50. Such changes as this are apparent to those skilled in the art and are therefore included in my invention.

While 33 has been shown as a fixed 90° phase shifter my invention also contemplates the use of a calibrated variable phase shift network 113 of Fig. 15 in place of the 90° phase shifter, and of course when the calibrated variable phase shifter is employed it may be left set at 90°, or may be used to measure the absolute value of the impedance by varying the phase until the output meter reads a maximum value. As pointed out above this maximum value would be proportional to $E_m$ and therefore to Z. The phase angle would also be read on the phase shifter control dial 114.

While center zero meters have been shown throughout obviously I prefer to use full scale deflection meters with reversing switches, as then the scale employed is larger and easier to read accurately.

As pointed out above many changes of circuits old in the art, and many substitutions of different tubes, conventional elements, or units having the same functions, may be done by those skilled in the art without involving invention, the scope of my invention being set forth in the following claims. And practicing the method of the invention entirely different instrumentalities may be employed without departing from the invention provided the method steps are followed as claimed.

Having described my invention, I claim:

1. In an alternating current impedance meter, a source of alternating current, a resistance unit, an impedance unit connected in series with said current source and said resistance unit, the impedance values of said units being so proportioned that the voltage drop across one of said units is negligible as compared with the voltage drop across the other of said units, a generator energized by said current source for producing a succession of square waves having a duration of one-half alternating current cycle and spaced by intervals of one-half alternating current cycle, an electron tube including an anode, a cathode, and control means for regulating the passage of electrons from the cathode to the anode, means for biasing said tube to reject voltages of less than a predetermined magnitude, an output circuit for said tube including a current source, the anode and cathode of said tube, and an indicating device, the components of said output circuit being connected in series, and means for electrically connecting said unit of lower impedance value and said square wave generator to said control means whereby the average current passing through said output circuit and said indicating device is controlled by the phase relationship between said square waves and the voltages developed across said impedance unit.

2. In an alternating current impedance meter, a source of alternating current, a resistance unit, an impedance unit connected in series with said current source and said resistance unit, the ohmic values of said units being so proportioned that the voltage drop across one of said units is negligible as compared with the voltage drop across the other of said units, a generator for producing a succession of square waves having a duration of one-half alternating current cycle, a branch circuit for connecting said current source to the input circuit of said generator whereby said square waves are spaced by intervals of one-half alternating current cycle, a 90 degree phase shifting device, a switch for selectively connecting said device in said branch circuit so that the square waves are 90 degrees out of phase with respect to said alternating current, an electron tube including an anode, a cathode, and control means for regulating the passage of electrons from the cathode to the anode, means for biasing said tube to reject voltages of less than a predetermined magnitude, an output circuit for said tube including a current source, the anode and cathode of said tube, and an indicating device, the components of said output circuit being connected in series, and means for electrically connecting said unit of lower impedance value and said square wave generator to said control means whereby the average current passing through said indicating device is controlled by the phase relationship between said square waves and the voltages developed across said impedance unit.

3. In an alternating current impedance meter, a source of alternating current, a resistance unit, an impedance unit connected in series with said current source and said resistance unit, the impedance values of said units being so proportioned that the voltage drop across one of said units is negligible as compared with the voltage drop across the other of said units, a generator actuated by said current source for producing a succession of square waves having a duration of one-half alternating current cycle and spaced by intervals of one-half alternating current cycle, means for electrically adding the voltage of said square wave generator to the voltage developed across said unit of lower impedance value to produce a resultant voltage, and means for measuring the average value of said resultant voltage above a predetermined magnitude.

4. In an alternating current impedance meter, a source of alternating current, a resistance unit, an impedance unit connected in series with said current source and said resistance unit, the impedance values of said units being so proportioned that the voltage drop across said impedance unit is negligible as compared with the voltage drop across the resistance unit, a generator actuated by said current source for producing a succession of square waves having a duration of one-half alternating current cycle and spaced by intervals of one-half alternating current cycle, means for establishing a predetermined phase relation between said square waves and said alternating current, means for electrically adding the voltage of said square wave generator to the voltage developed across said impedance unit to produce a resultant voltage, and means for measuring the average value of said resultant voltage above a predetermined magnitude.

5. In an alternating current impedance meter, a source of alternating current, a resistance unit, an impedance unit connected in series with said current source and said resistance unit, the voltage drop across said impedance being negligible as compared with the voltage drop across said resistance, a generator for producing square waves each having a duration of one-half alternating current cycle, said generator being actuated by said current source whereby said square waves are spaced by intervals of one-half alternating current cycle, an electron tube including an anode, a cathode, and control means for regulating the passage of electrons from the cathode to the anode, means for biasing said tube to reject voltages of less than a predetermined magnitude, an output circuit for said tube including a current source, the anode and cathode of said tube, and an indicating device, the components of said output circuit being connected in series, and means for electrically connecting said impedance unit and said square wave generator to said control means whereby the average current passing through said output circuit and said indicating device is controlled by the phase relationship between said square waves and the voltage developed across said impedance unit.

6. In an alternating current impedance meter, a source of alternating current, a resistance unit, an impedance unit connected in series with said current source and said resistance unit, the voltage drop across said impedance being negligible as compared with the voltage drop across said resistance, a generator for producing square waves each having a duration of one-half alternating current cycle, a phase shifting circuit actuated by said current source, leads connecting the output of said phase shifting circuit to the input circuit of said generator whereby said square waves are spaced by intervals of one-half alternating current cycle and have a predetermined phase relationship with respect to the alternating current produced by said source, an electron tube including an anode, a cathode, and control means for regulating the passage of electrons from the cathode to the anode, means for biasing said tube to reject voltages of less than a predetermined magnitude, an output circuit for said tube including a current source, the anode and cathode of said tube, and an indicating device, the components of said output circuit being connected in series, and means for electrically connecting said impedance unit and said square wave generator to said control means whereby the average current passing through said output circuit and said indicating device is controlled by the phase relationship between said square waves and the voltages developed across said impedance unit.

7. In an alternating current impedance meter, a source of alternating current, a resistance, an impedance connected in series with said current source and said resistance, the ohmic value of said resistance being negligible as compared with the impedance value of said impedance whereby the voltage drop across said impedance is proportional to the impedance thereof, a generator for producing square waves each having a duration of one-half alternating current cycle, a 90 degree phase shifting circuit actuated by said current source, leads connecting the output of said phase shifting circuit to the input circuit of said generator whereby said square waves are spaced by intervals of one-half alternating current cycle and are 90 degrees out of phase with respect to the alternating current produced by said source, an electron tube including an anode, a cathode, and control means for regulating the passage of electrons from the cathode to the anode, means for biasing said tube to reject voltages of less than a predetermined magnitude, an output circuit for said tube including a current source, the anode and cathode of said tube, and an indicating device, the components of said output circuit being connected in series, and means for electrically connecting said impedance unit and said square wave generator to said control means whereby the average current passing through said indicating device is proportional to the reactive component of the voltage developed across said impedance.

8. In an alternating current impedance meter, a source of alternating current, a resistance unit, an impedance unit connected in series with said current source and said resistance unit, the impedance values of said units being so proportioned that the voltage drop across one of said units is negligible as compared with the voltage drop across the other of said units, a generator for producing a succession of square waves having a duration of one-half alternating current cycle and spaced by intervals of one-half alternating current cycle, a frequency doubling push-pull transmission circuit including a plurality of electron tubes each having an anode, a cathode, and control means for regulating the passage of electrons from the cathode to the anode, a balanced output circuit for said tubes including a current source, the anode and cathode of each tube, and an indicating device, and means for electrically interconnecting said unit of smaller impedance value, said square wave generator, and each of said control means whereby the average current passing through said indicating device is controlled by the phase relationship between said square waves and the voltages developed across said impedance unit.

9. In an alternating current impedance meter, a source of alternating current, a resistance, an impedance connected in series with said current source and said resistance, the ohmic value of said resistance being negligible as compared with the impedance value of said impedance whereby the voltage drop across said impedance is proportional to the impedance thereof, a pair of generators each adapted to produce a succession of square waves having a duration of one-half alternating current cycle, means for feeding alternating current from said source directly to one of said generators to produce first square waves which are in phase with said alternating current, a 90 degree phase shifting device fed by said alternating current source, leads connecting the output of said device to the second square wave generator to produce second square waves which are 90 degrees out of phase with said alternating current source, means for adding said first square waves to the voltage drop developed across said impedance to produce a first resultant voltage proportional to the resistive component of the voltage appearing across said impedance, means for adding said second square waves to said voltage appearing across said impedance to produce a second resultant voltage proportional to the reactance component of the voltage developed across said resistor, and means for independently measuring the average values of said resultant voltages.

10. In an alternating current impedance meter, an impedance unit, means including an alternating current source for passing a constant current through said impedance unit, whereby the voltage drop across said unit is proportional to the impedance thereof, a square wave generator triggered by said current source to produce a succession of square waves having a duration of one-half alternating current cycle and spaced by intervals of one-half alternating current cycle, means for electrically adding the square wave voltages and the voltage across said impedance unit to provide a resultant voltage, and means for measuring the average value of said resultant voltage above a predetermined magnitude.

11. In an alternating current impedance meter, an impedance unit, a device for passing a constant current through said impedance unit whereby the voltage drop across said unit is proportional to the impedance thereof, said device having a circuit connected to said impedance unit, said circuit having a resistance many times greater than that of said impedance unit and including an alternating current source, a square wave generator triggered by said current source to produce a succession of square waves having a duration of one-half alternating current cycle and spaced by intervals of one-half alternating current cycle, means for electrically adding the square wave voltages and the voltages across said impedance unit to provide a resultant voltage, and means for measuring the average value of said resultant voltage above a predetermined magnitude.

12. In an alternating current impedance meter, a source of alternating current, a resistance, an impedance connected in series with said current source and said resistance, the ohmic value of said resistance being negligible as compared with the impedance value of said impedance whereby the voltage drop across said impedance is proportional to the impedance thereof, a generator for producing square waves each having a duration of one-half alternating current cycle, said generator being actuated directly by said current source whereby said square waves are spaced by intervals of one-half alternating current cycle and are in phase with the alternating current produced by said source, an electron tube including an anode, a cathode, and control means for regulating the passage of electrons from the cathode to the anode, means for biasing the control grid so that the positive part of the square wave exceeds the voltage of zero conduction by an amount greater than the maximum amplitude of the voltage to be measured and the negative part of the square wave is more negative than the voltage of zero conduction by an amount exceeding the maximum value of the voltage to be measured, an output circuit for said tube including a current source, the anode and cathode of said tube, and an indicating device, the components of said output circuit being connected in series, and means for electrically connecting said impedance unit and said square wave generator to said control means whereby the average current passing through said indicating device is controlled by the phase relationship between said square waves and the voltages developed across said impedance unit.

13. In an alternating current impedance meter, a source of alternating current, a resistance, an impedance connected in series with said current source and said resistance, the ohmic value of said impedance being negligible as compared with the ohmic value of said resistance whereby the voltage drop across said resistance is proportional to the reciprocal of the impedance thereof, a generator for producing square waves each having a duration of one-half alternating current cycle, a branch circuit for connecting said current source directly to said generator whereby said square waves are in phase with said alternating currents, a 90 degree phase shifting device, a switch for selectively connecting said device in said branch circuit thereby to produce square waves which are 90 degrees out of phase with said alternating current, an electron tube including an anode, a cathode, and a control grid, means for electrically connecting said resistance and said square wave generator to said control grid, means for biasing the control grid so that the positive part of the square wave exceeds the voltage of zero conduction by an amount greater than the maximum amplitude of the voltage to be measured and the negative part of the square wave is more negative than the voltage of zero conduction by an amount exceeding the maximum value of the voltage to be measured, and an output circuit for said tube including a current source, the anode and cathode of said tube, and an indicating device, the components of said output circuit being connected in series, whereby the reading of said indicating device is proportional to the susceptance component of the voltage appearing across said impedance when said phase shifting device is connected in said branch circuit, said reading being proportional to the conductance component when said device is disconnected from said branch conduit.

RAYMOND G. PIETY.

REFERENCES CITED

The following references are of record in the file of this patent:

UNITED STATES PATENTS

| Number | Name | Date |
|---|---|---|
| 1,660,405 | Affel | Feb. 28, 1928 |
| 1,728,835 | Petch | Sept. 17, 1929 |
| 2,171,536 | Bingley | Sept. 5, 1939 |
| 2,223,840 | Wolff | Dec. 3, 1940 |
| 2,230,297 | Inoue | Feb. 4, 1941 |
| 2,232,792 | Levin | Feb. 25, 1941 |
| 2,277,000 | Bingley | Mar. 17, 1942 |
| 2,287,174 | Heising | June 23, 1942 |
| 2,294,659 | Herold | Sept. 1, 1942 |
| 2,335,265 | Dodington | Nov. 30, 1943 |
| 2,376,394 | Sinclair | May 22, 1945 |